United States Patent
Tsybulnyk et al.

(10) Patent No.: US 10,719,336 B1
(45) Date of Patent: Jul. 21, 2020

(54) DEPENDENCY VERSION CONFLICT AUTO-RESOLUTION

(71) Applicant: Microsoft Technology Licensing, LLC, Redmond, WA (US)

(72) Inventors: Vitalii Tsybulnyk, Redmond, WA (US); Aritra Dattagupta, Redmond, WA (US); Marwan Elias Jubran, Kirkland, WA (US); Willy Tanimihardja, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/411,233

(22) Filed: May 14, 2019

(51) Int. Cl.
| | |
|---|---|
| *G06F 9/44* | (2018.01) |
| *G06F 9/445* | (2018.01) |
| *G06F 9/38* | (2018.01) |
| *G06F 9/48* | (2006.01) |

(52) U.S. Cl.
CPC ........ *G06F 9/44552* (2013.01); *G06F 9/3838* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 7,395,529 B1 * | 7/2008 | Stanton | ..................... | G06F 8/71 |
| | | | | 717/131 |
| 2011/0276977 A1 | 11/2011 | van velzen et al. | | |
| 2015/0347193 A1 | 12/2015 | Wolfson et al. | | |
| 2017/0083369 A1 | 3/2017 | Jubran et al. | | |
| 2017/0195183 A1 | 7/2017 | Gershaft et al. | | |
| 2018/0157466 A1 | 6/2018 | Jubran et al. | | |
| 2018/0159743 A1 | 6/2018 | Jubran et al. | | |
| 2018/0341516 A1 | 11/2018 | Gupta et al. | | |
| 2019/0089594 A1 | 3/2019 | Jubran et al. | | |

OTHER PUBLICATIONS

"International Search Report and Written Opinion Issued in PCT Application No. PCT/US20/019561", dated Apr. 9, 2020, 11 Pages.

* cited by examiner

*Primary Examiner* — Craig C Dorais
(74) *Attorney, Agent, or Firm* — Rainier Patents, P.S.

(57) ABSTRACT

Described herein is a system and method for dependency version conflict auto-resolution for executing job(s). During execution of a particular version of a workflow comprising tasks, information regarding a particular task to be executed is received. The particular task is dependent on another task. Information regarding the dependency is retrieved from a global dependency data structure (e.g., graph) that stores current dependency information regarding the tasks. When it is determined that the conflict exists with respect to the dependency of the particular task on the another task, information regarding the dependency and workflows is retrieved, information regarding a dependency change history regarding at least one of the plurality of tasks, information regarding the particular version of the workflow and a different version of the workflow. A resolution to the conflict can be identified based, at least in part, upon the retrieved information, and, a correct action performed.

19 Claims, 6 Drawing Sheets

DEPENDENCY VERSION CONFLICT AUTO-RESOLUTION

BACKGROUND

Complex processes involving many tasks some of which may be dependent on other task(s) can be difficult to accurately model a priori. For example, processing performed by particular tasks may frequently change and/or dependencies of particular tasks may change after a particular job has commenced.

SUMMARY

Described herein is a system for a system for job execution, comprising: a computer comprising a processor and a memory having computer-executable instructions stored thereupon which, when executed by the processor, cause the computer to: during execution of a particular version of a workflow comprising a plurality of tasks, receive information regarding a particular task of the plurality of tasks to be executed, the particular task dependent on another task of the plurality of tasks; retrieve information regarding the dependency from a global dependency data structure, wherein the global dependency data structure stores current dependency information regarding the plurality of tasks; determine whether a conflict exists with respect to the dependency of the particular task on the another task; and when it is determined that the conflict exists: retrieve information regarding the dependency and a plurality of workflows; retrieve information regarding a dependency change history regarding at least one of the plurality of tasks; retrieve information regarding the particular version of the workflow and a different version of the workflow; identify a resolution for the conflict based, at least in part, upon the information retrieved from the global dependency data structure, the retrieved information regarding the dependency change history regarding at least one of the plurality of tasks, the information retrieved regarding the dependency and the plurality of workflows, and the information retrieved regarding the particular version of the workflow and the different version of the workflow; and perform a corrective action to resolve the conflict based, at least in part, upon the identified resolution.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
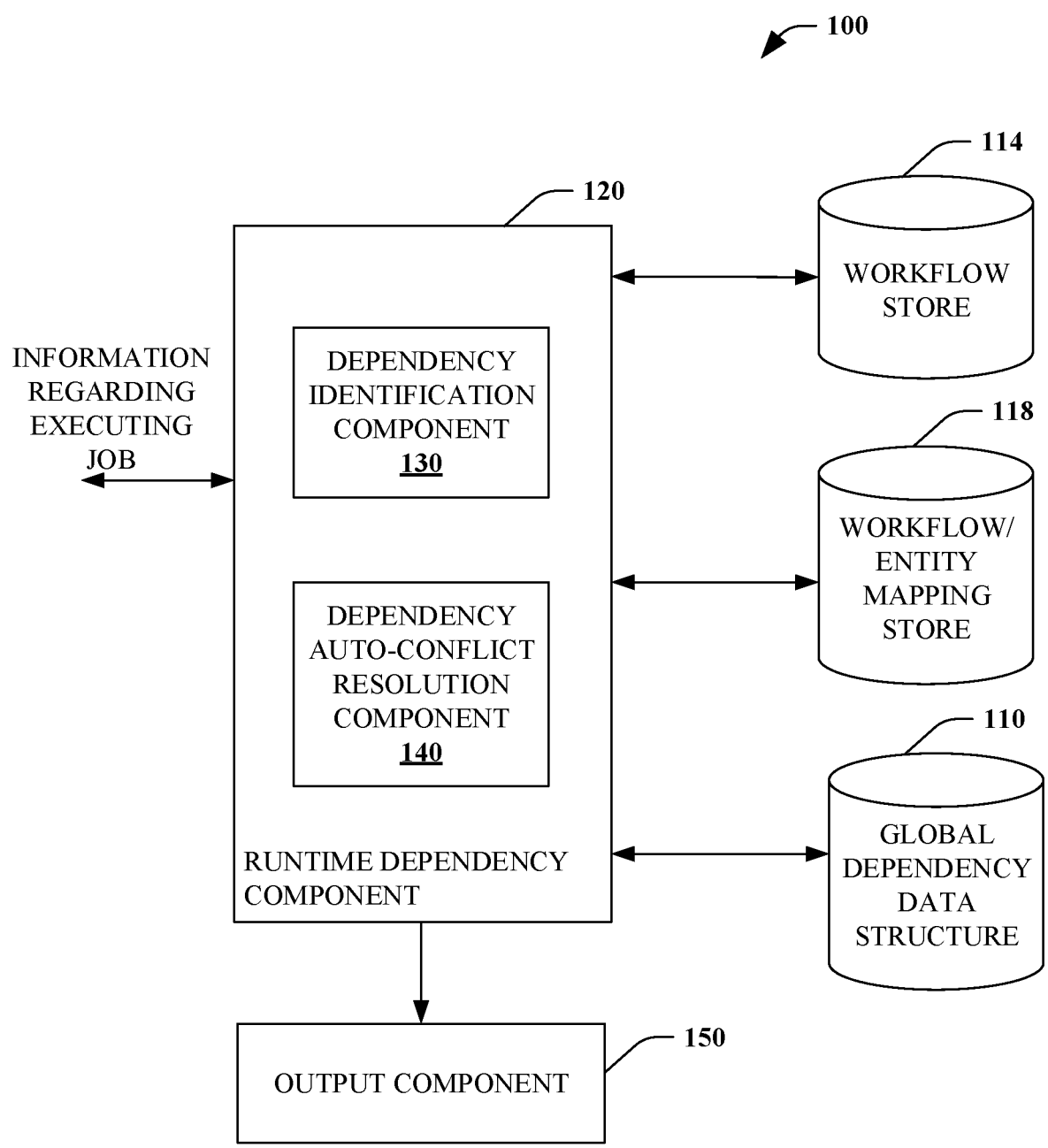
FIG. 1 is a functional block diagram that illustrates a system for job execution.

Various technologies pertaining to dependency version conflict auto-resolution are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding dependency version conflict auto-resolution. What follows are one or more exemplary systems and methods.

Aspects of the subject disclosure pertain to the technical problem of detecting dependency conflict(s) of task(s) and/or sub-task(s) of an executing job(s). The technical features associated with addressing this problem involve, during execution of a particular version of a workflow comprising a plurality of tasks, receiving information regarding a particular task of the plurality of tasks to be executed, the particular task dependent on another task of the plurality of tasks; retrieving information regarding the dependency from a global dependency data structure, wherein the global dependency data structure stores current dependency information regarding the plurality of tasks; determining whether a conflict exists with respect to the dependency of the particular task on the another task; and when it is determined that the conflict exists: retrieving information regarding the dependency and a plurality of workflows; retrieving information regarding a dependency change history regarding at least one of the plurality of tasks; retrieving information regarding the particular version of the workflow and a different version of the workflow; identifying a resolution for the conflict based, at least in part, upon the information retrieved from the global dependency data structure, the retrieved information regarding the dependency change history regarding at least one of the plurality of tasks, the information retrieved regarding the dependency and the plurality of workflows, and the information retrieved regarding the particular version of the workflow and the different version of the workflow; and performing a corrective action to resolve the conflict based, at least in part, upon the identified resolution. Accordingly, aspects of these technical features exhibit technical effects of more efficiently and effectively executing jobs, for example, reducing consumption of computing resource(s) and/or bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Conventionally, job(s) and process(es) can be automated workflows (tasks). Typical workflows can be complex composites of many sub-workflows (sub-jobs) and individual activities (tasks) that are owned by various teams (owning teams), some of which run in parallel to each other, and can have a significant number of dependencies.

Systems that are designed to drive long-running processes require declaration of dependencies between various phases, and orchestration according to those dependencies. For example, long-running processes/jobs can have multiple instances running at the same time, with various versions of a particular workflow. This can present significant challenges regarding how to orchestrate between jobs with different versions of the same workflow (e.g., different version(s) of task(s)/subtask(s) and/or dependency(ies) of the task(s)/subtask(s)).

As discussed in greater detail below, for purposes of explanation and not limitation, a job can be represented as an execution graph (or tree) comprised of a plurality of nodes with each node representing a particular task (or subtask). At least some of the nodes can dependent upon processing of one or more other nodes. In some embodiments, a dependency can be based upon a particular node that can only be performed after completion of processing of another node. In some embodiments, a dependency can be based upon a particular node that can only be performed after receiving information from another node (e.g., during processing of the another node and/or upon completion of processing of the another node).

Described herein is a system and method for job execution utilizing a single version of a global dependency data structure. The global dependency data structure serves as one and only source of truth about all dependency modeling (e.g., for current version(s), previous version(s), and, optionally, future version(s)) that is currently applied onto the job execution environment. In some embodiments, an advantage of this approach is to simplify the graph deployment model when dealing with cross-job dependencies, since there is only need for one single version to maintain. For cross-version orchestration, the system employs an automated conflict resolution process instead of a significantly more complex solution of maintaining multiple versions of the dependency graph.

For purposes of explanation and not limitation, the system and method are described in the context of a workflows/jobs for a buildout process for computer datacenter(s); however, the system and method can be utilized to perform dependency version conflict auto-resolution for other complex processes involving many tasks some of which are dependent on other task(s). For example, the system and method can be utilized to perform dependency version conflict auto-resolution in process(es) for software development, manufacturing, and the like.

Referring to FIG. 1, a system for job execution 100 is illustrated. The system 100 employs dependency aware orchestration by employing a global dependency data structure 110 (e.g., global dependency graph). The global dependency data structure 110 can serve as the one and only source of truth about dependency modeling that is currently applied onto system 100. In some embodiments, an advantage of this approach is to simplify the schema deployment model when dealing with cross-job dependencies since the system 100 only has a single version to maintain via the global dependency data structure 110.

As used in herein, a "job" refers to an overall process comprised of a plurality of workflows comprising one or more tasks. Each task can include zero, one, or more subtasks, etc. In some embodiments, an owner (e.g., ownership team) can be assigned responsibility for each task. A task can be an automated process (e.g., configuration of a module of software), semi-automated process (e.g., configuration of a module of software with human input), and/or manual process (e.g., receive human input, physically install a piece of hardware).

Information regarding workflow(s) (and any associated task(s) and/or subtask(s) can be stored in a workflow store 114. In some embodiments, the information can include code for a particular version of a workflow, and, a declaration of dependency(ies), if any. The workflow store 114 can store information (e.g., code and dependency(ies) declaration(s)) for a plurality of versions of a particular workflow.

The system 100 can further include a workflow/mapping store 118 that stores information regarding dependency(ies) of task(s) and a plurality of workflows. In some embodiments, information regarding how a specific entity is tied to a workflow can be stored in the workflow/entity mapping store 118. The information can include tracked information mapping an entity to a workflow code package. In some embodiments, the workflow/mapping store 118 can further store information a dependency change history regarding at least one of the plurality of tasks, and/or information regarding a particular version of the workflow and a different version of the workflow.

Management of ever-changing dependency schema(s) for job(s) in various stage(s) of execution is an extremely complex scenario. For example, rolling out a new schema update can become increasingly and can lead to breaking existing job(s).

Utilizing the global dependency data structure 110, when there is a need to remove a particular dependency of a particular workflow, a developer can perform the following sequence of steps. First, the developer removes the dependency association from the workflow code (e.g., by removing its binding to the task, or by removing the entire task from the workflow). Next, the new workflow code is rolled out to running jobs. In some example, an average job execution environment can have approximately a thousand jobs per buildout type running daily, so updating the package for all of them can be a huge operational burden. Also, there can be numerous complex scenarios where jobs run for months and rolling out a package change may not feasible. Finally, the dependency is removed from the global dependency data structure 110.

If there are any deviations from these steps, the removal process can cause issue(s). For example, if the workflow code rollout misses any job, then removed dependencies are still bound to active jobs and can cause issues, introducing a need of manual backfilling of data.

Similarly, utilizing the global dependency data structure 110, when there is a need to add a dependency within a particular workflow, a developer can be required to follow the precise sequence of steps. First, the new dependency is added to the global dependency data structure 110. Next, the first workflow code is updated to bind a certain task to the pre-requisite end of the dependency entity. Next, the new workflow code is rolled out to running jobs (e.g., which can be extremely costly and sometimes not practical). Then, a second workflow code is then updated to bind some task to the waiting end of the dependency entity. The second workflow code is then rolled out to running jobs. Again, any deviations from these steps can cause issue(s) and require manual workaround(s).

Figure 2:
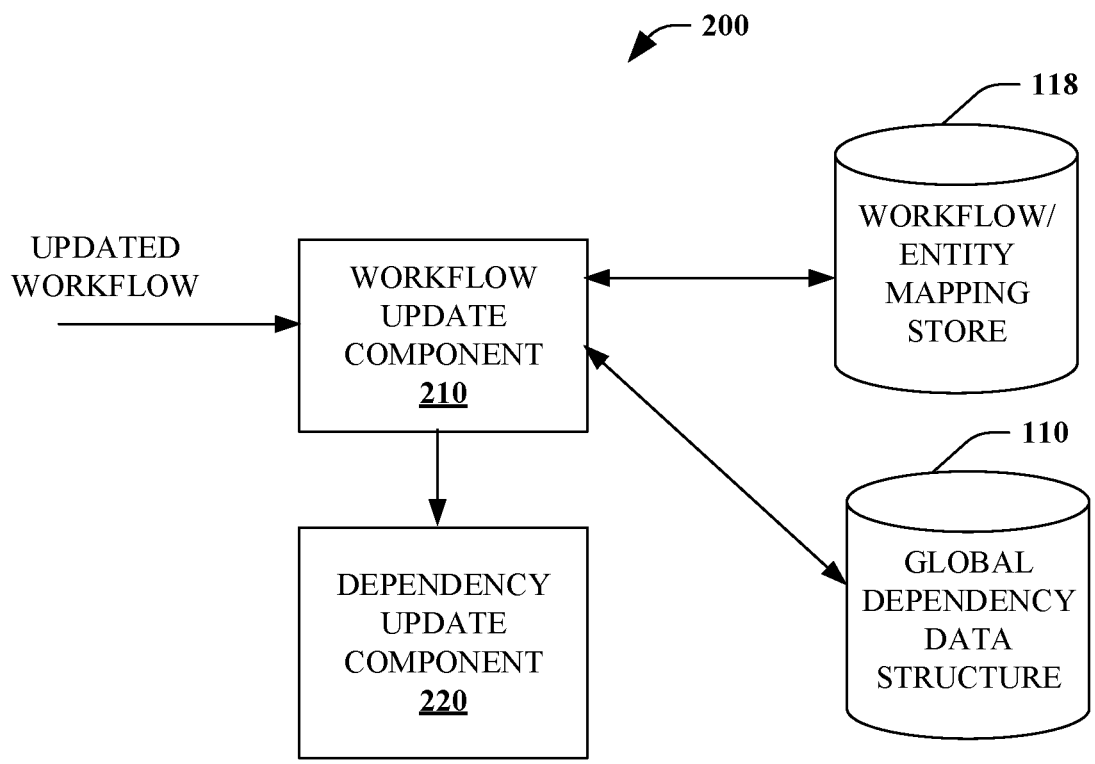
FIG. 2 is a functional block diagram that illustrates a workflow submission system.

The global dependency data structure 110 tracks dependency entity change(s), for example, for various version(s) of workflow(s). Referring briefly to FIG. 2, a workflow submission system 200 is illustrated. The system 200 includes a workflow update component 210 that receives an updated workflow. The workflow update component 210 stores the updated workflow in the workflow store 114.

The system 200 further includes a dependency update component 220 that determines any change(s) in a schema of the updated workflow based, at least in part, upon information previously stored in the global dependency data structure 110. In some embodiments, the dependency update component 220 can achieve an understanding of the schema change(s) by tracking dependency entity changes.

Next, the dependency update component 220 can further determine how a specific entity is tied to a particular workflow. This can be achieved by tracking mapping between entity and workflow code package. In some embodiments, the dependency update component 220 can store information regarding any changes in the schema in the global dependency data structure 110 (e.g., schema change delta), and, how a specific entity is tied to a particular workflow, in the global workflow/mapping store 118 (e.g., tracking of dependency entity mapping). This information can be utilized at runtime to allow for a determination by the job execution environment that, in additional to checking for the existence of an entity, changes in the entity and what is happening on the package associated tasks is also taken into consideration, as discussed below.

Returning to FIG. 1, the system 100 includes a runtime dependency component 120 that can perform dependency auto-conflict resolution, at runtime, to overcome the potential issues arising from dependency version mismatch, for example, from a removed dependency, an added dependency, and/or a dependency scope change.

The runtime dependency component 120 includes a dependency identification component 130 and a dependency auto-conflict resolution component 140. The dependency identification component 130 retrieves dependency information regarding a particular workflow from the global dependency data structure 110 and identifies dependency(ies), if any, of a current version of the particular workflow.

The dependency auto-conflict resolution component 140 can perform one or more auto-conflict resolution acts if any of the identified dependency(ies) are determined to be problematic. By examining dependency(ies) at runtime, the runtime dependency component 120 can (1) check for the existence of an entity, (2) take into consideration what changed in the entity; and, (3) what is happening on the package associated task(s). As each job package can now be mix-matched with the dependency schema—consequently, it is highly possible that for across jobs interaction scenario, one package has dependency entities that is conflicting with others. In some embodiments, the auto-conflict resolution component 140 can automatically resolve a conflict based, at least in part, upon information retrieved from the global dependency structure 110, and, information retrieved regarding the dependency and the plurality of workflows the workflow/entity mapping store 118. In some embodiments, the runtime dependency component 120 can provide information to a user (e.g., human) regarding a broken dependency relationship (incident) via an output component 150 (e.g., via a graphical user interface, a report).

Dependency change scenario(s) can include dependency addition and/or dependency removal. For purposes of explanation and not limitation, the following symbols and convention will be utilized to depict the package and its dependency schema:

[Package, Job]: [Dependency Entity]
→indicates dependency relationship
N/A indicates "don't care or no dependency relationship exists"
<-> indicates task bound to dependency entity Table 1

Dependency Removal Scenario
1. In Progress, Schema Change to Remove Dependency
Within a package P, a job J1 start with schema A→B. However, while the job in progress, the schema is changed to remove the dependency:
Initially
[P, J1]: A→B
Finally
[P, J1]: N/A Table 2

Conventionally, because the job started with schema A→B it uses that and waits for the dependency.

With the system 100, when the job reaches for a dependency check, it will not wait for any dependency based dependency information stored in the global dependency data structure 110. Since the current workflow does not include the previous dependency, the job will not wait.

2. In Progress, Satisfying Task Changed to Use a Different Package
Jobs starts with schema A→B. However, while in progress, the task which satisfies B is changed to use a different package which doesn't contain the entity B. This can be within the same job or across jobs.
Across jobs
Initially
[P1, J1]: A→B
[P2, J2]: A→B
Finally
[P1, J1]: A→B
[P3, J2]: null
Within job
Initially
[P1, J1]: A→B
Finally
[P2, J1]: null Table 3

Conventionally, an incident is created; however, the incident doesn't contain additional details can be difficult to quickly understand what went wrong.

With the system 100, if there is a task <-> A, but no task <-> B then the dependency relationship is considered broken and the incident can created with additional information identifying the broken dependency, for example, "B was bound to task in package P2, not in the current package P3".

The additional information can be based, at least in part, upon information obtained from the global dependency data structure 110, and, the workflow/entity mapping store 118.

3. In Progress, Workflow Package Changed

Initially, a job has a dependency A→B with both A and B attached to tasks within same workflow. The workflow package is changed so that the task which emits the entity is not present.

Initially
[P1, J1]: A→B
Finally
[P2, J1]: null

Table 4

Conventionally, an incident is created without any additional details.

With the system 100, if there is a task <-> A, but no task <-> B then the dependency relationship is considered broken and the incident can be created with additional information, for example, "B was bound to task in package P1, not in the current package P2". The additional information can be based, at least in part, upon information obtained from the global dependency data structure 110, and, the workflow/ entity mapping store 118.

Dependency Addition Scenario

1. In Progress, with Bound Tasks, Schema Changed to Add Dependency

Initially a job starts with tasks bound to A and bound to B with no dependencies. While the job is in progress, the schema changed to add A→B:

Initially
[P, J1]: N/A
Finally
[P, J1]: A→B

Table 5

Conventionally, since the schema changed in between job commencement and a current time, and the current schema is always the source of truth, the job will wait on the dependency without checking the active binding.

With the system 100, since a task is <-> A and a task is <-> B, but since the package has both tasks, in some embodiments, additional information is required. First, if the task is actively bound, the system 100 will wait for the dependency to be satisfied. If the task is bound but inactive (e.g., it is guarded by a flag whose value is unknown at this point), the system 100 will wait until the task is started.

In doing so, the system 100 will check the global dependency data structure 110 and the workflow/entity mapping store 118 to obtain the current details of the entity and which package contains which entity. Also, the bound dependency entity is checked to see the active binding of the tasks with the entities.

2. In Progress, Schema Changed to Add Dependency with an Initially Unbound Task

In this scenario, when the job started, there are tasks which bound to A but not bound to B with no dependencies. While the job is in progress, the schema changed to add A→B:

Initially
[P, J1]: N/A
Finally
[P, J1]: A→B

Table 6

Conventionally, the execution environment notes the schema, observes the new dependency and throws an unsatisfied dependency error without any additional details.

With the system 100, it can be observed that a task is bound to A and but a task is not bound to B. Since the package didn't change, the system 100 can determine (a) when the dependency was introduced (from the global dependency data structure 110), and, (b) when the package was created (from the workflow/entity mapping store 118). If a>b (dependency was introduced after the package was created), the dependency can be skipped (e.g., ignored). If a<=b (dependency was introduced before or at the same time the package was created), the dependency relationship is determined by the system 100 to be broken. The system 100 can create an incident providing information regarding the determined broken dependency relationship, for example, "B is never bound to any task in P".

Dependency Scope Type Change Scenario

In some embodiments, dependency scope is another variable to be taken into consideration by the system 100. In some scenarios, each dependency exists in one or many different scope types (e.g. action A depends on action B for the buildout of given new cluster, but both of them depend on action C performed by the buildout of the entire datacenter where new cluster is built). Conflict auto-resolution of the system 100 can helpful when dependency scope type is changed.

Scope type removal is usually not a problem, because scope type can be simply removed from the global schema, and all jobs can will immediately start ignoring it from their dependency orchestration.

However, scope type addition can be problematic, because if old prerequisites were satisfied with old subset of scope types, which means that jobs reaching orchestration point after scope type addition won't have correct information about pre-requisites. The system 100 can facilitate auto-resolution by expanding orchestration point checks to take supported scope types into account.

For example, if A depends on B, and dependency B had a scope of "Cluster" and it was changed (expanded to have a scope of both "Cluster" and "Region", the system 100 use information from the workflow/entity mapping store 118 (e.g., an OtherScopeValue) when validating. Accordingly, when the system 100 evaluates A for pre-requisite B, the system 100 can determine whether B is present at all. The system 100 can further determine, if in one such occurrence, the Regional value of OtherScopeValues also matches with the regional value which is in context of A. If the system 100 determines the match, then it will satisfy the dependency instead of throwing incident(s).

If the scope changes from one scope type to another, then auto-resolution of the system 100 can check relationship between scopes (e.g. scopes types can be nested to each other or completely independent). If the change goes from smaller scope X to a larger scope Y that completely includes X, any dependency that uses the new scope can be auto-resolved by checking that the older scope dependency is satisfied. If the scope change has no nesting relations, auto-resolution of the system 100 is not performed; however, the system 100 can populate an incident, for example, with information to help operator manually resolve the issue (e.g. "dependency schema was changed with change in scope from Cluster to Regional").

Figure 3:
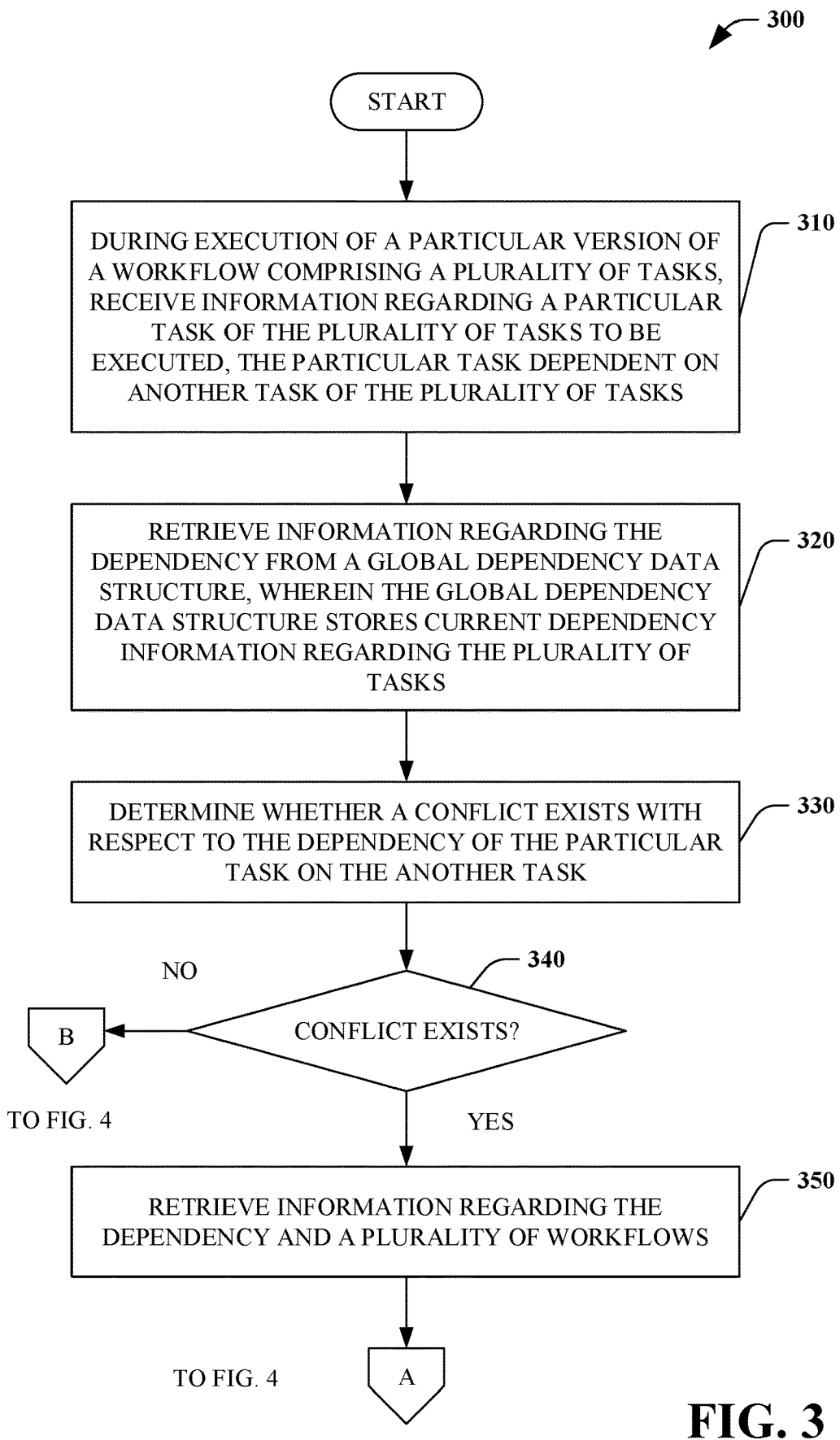
FIGS. 3 and 4 are flow charts of a method of dependency version conflict auto-resolution.
Figure 4:
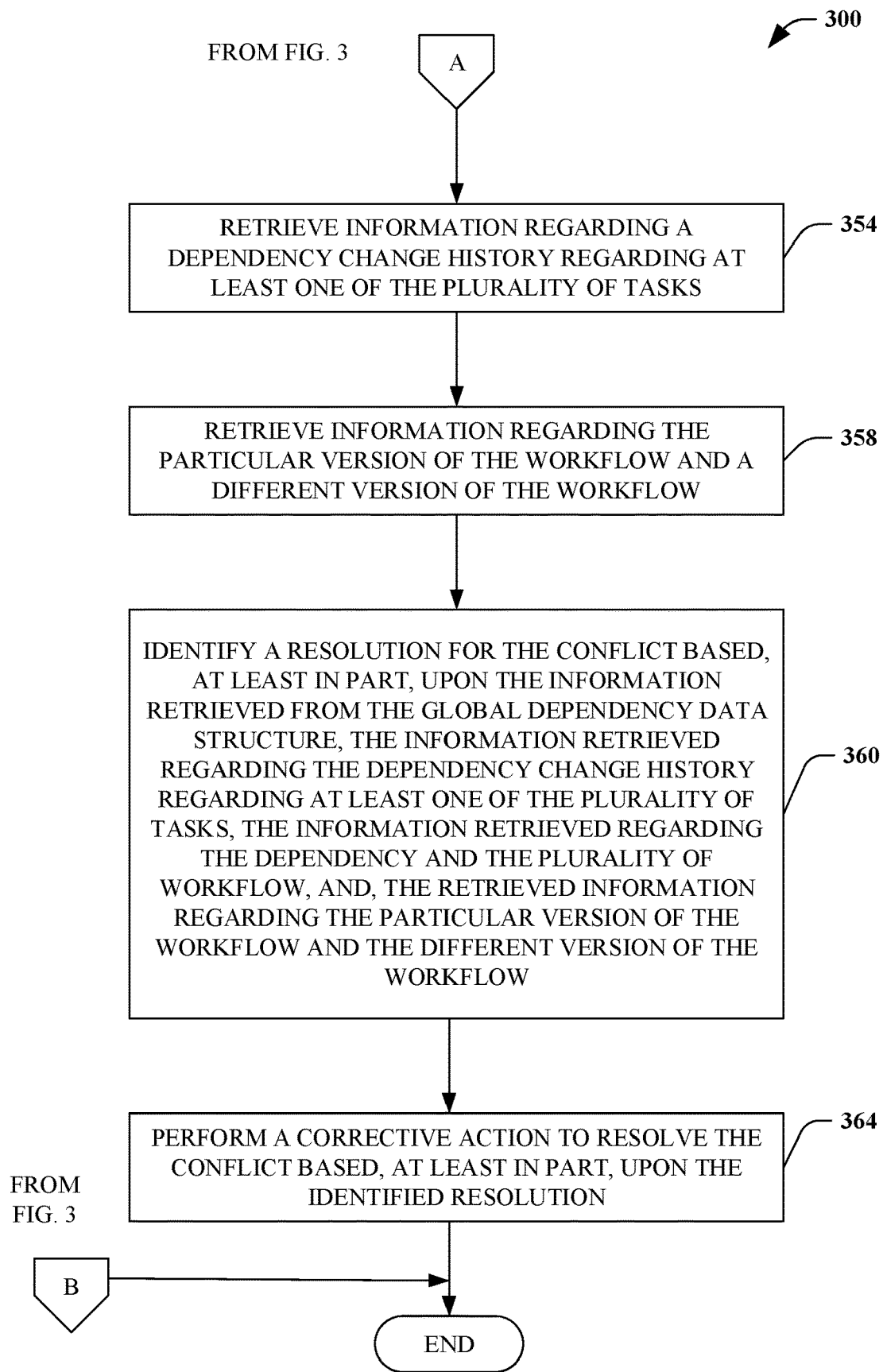
Figure 5:
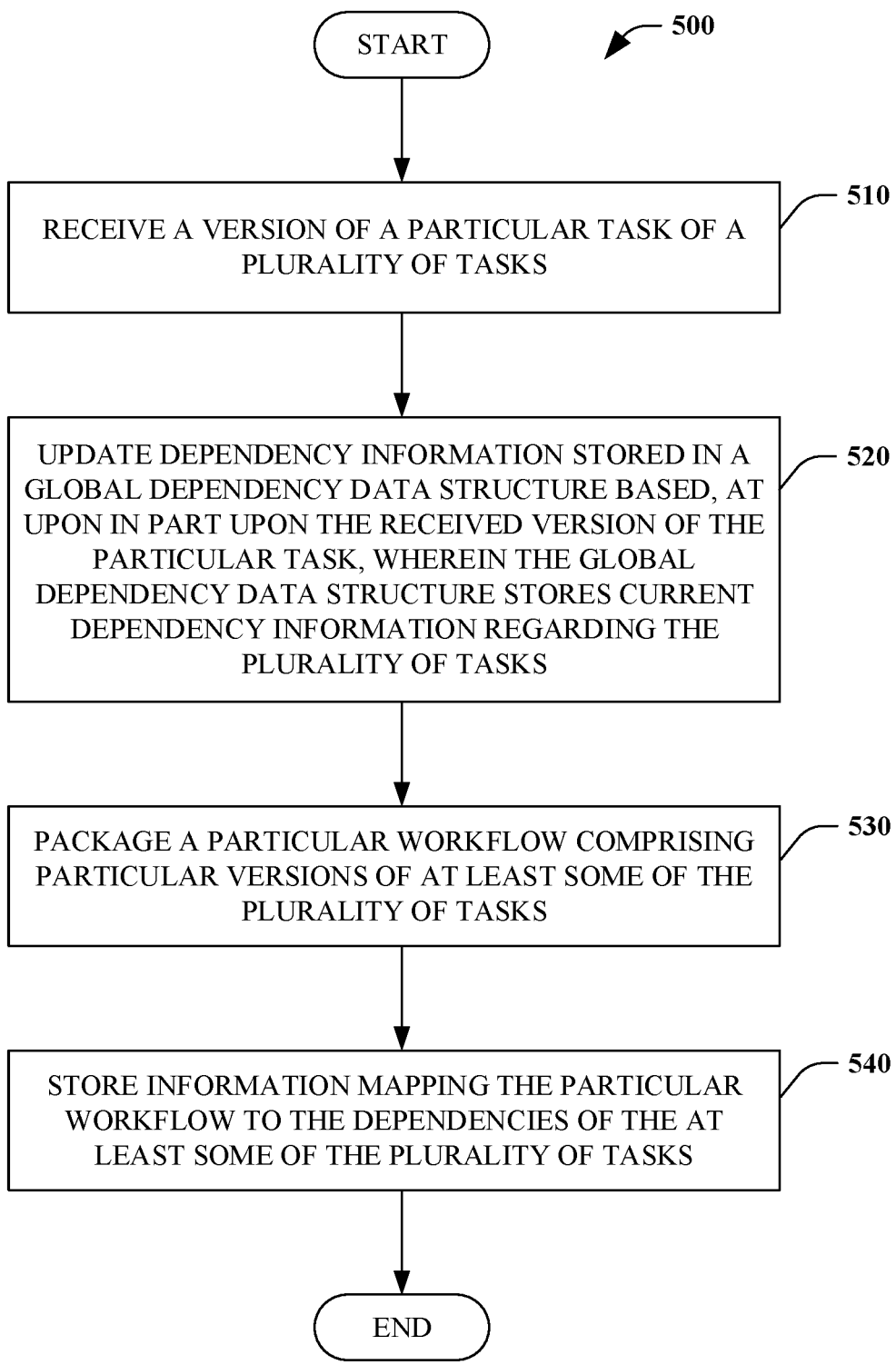
FIG. 5 is a flow chart of a method of workflow submission.

FIGS. 3-5 illustrate exemplary methodologies relating to dependency version conflict auto-resolution. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIGS. 3 and 4, a method of dependency version conflict auto-resolution 300 is illustrated. In some embodiments, the method 300 is performed by the system 100.

At 310, during execution of a particular version of a workflow comprising a plurality of tasks, information regarding a particular task of the plurality of tasks to be executed is received. The particular task is dependent on another task of the plurality of tasks.

At 320, information regarding the dependency is retrieved from a global dependency data structure. The global dependency data structure stores current dependency information regarding the plurality of tasks.

At 330, a determination is made as to whether or not a conflict exists with respect to the dependency of the particular task on the another task. For example, the conflict can be task linked to a non-existing dependency entity, and/or one entity depending on another entity which is not linked to any task in any of the workflows that comprise given job.

If the determination at 330 is NO, no further processing occurs. If the determination at 330 is YES, at 340 when it is determined that the conflict exists: at 350, information regarding the dependency and a plurality of workflows is retrieved. At 354, information regarding a dependency change history regarding at least one of the plurality of tasks is retrieved. At 358, information regarding the particular version of the workflow and a different version of the workflow is retrieved.

At 360, a resolution for the conflict is identified based, at least in part, upon the information retrieved from the global dependency data structure, the information retrieved regarding the dependency change history regarding at least one of the plurality of tasks, the information retrieved regarding the dependency and the plurality of workflows, and, the information retrieved regarding the particular version of the workflow and the different version of the workflow.

At 364, a corrective action is performed to resolved the conflict based, at least in part, upon the identified resolution. In some embodiments, the corrective action can include, skipping a dependency if it is no longer applicable, waiting for a dependency if it is still applicable, updating a version of the workflow to a newer one that does not have a conflict, and/or escalating to a user to perform corrective action manually, for example, using detailed information about the identified conflict and its history.

Turning to FIG. 5, a method of workflow submission 500 is illustrated. In some embodiments, the method 500 is performed by the system 200.

At 510, a version of a particular task of a plurality of tasks is received. At 520, dependency information stored in a global dependency data structure is updated based, at upon in part upon the received version of the particular task. The global dependency data structure stores current dependency information regarding the plurality of tasks. At 530, package a particular workflow comprising particular versions of at least some of the plurality of tasks is packaged. At 540, information mapping the particular workflow to the dependencies of the at least some of the plurality of tasks is stored.

Described herein is a system for job execution, comprising: a computer comprising a processor and a memory having computer-executable instructions stored thereupon which, when executed by the processor, cause the computer to: during execution of a particular version of a workflow comprising a plurality of tasks, receive information regarding a particular task of the plurality of tasks to be executed, the particular task dependent on another task of the plurality of tasks; retrieve information regarding the dependency from a global dependency data structure, wherein the global dependency data structure stores current dependency information regarding the plurality of tasks; determine whether a conflict exists with respect to the dependency of the particular task on the another task; and when it is determined that the conflict exists: retrieve information regarding the dependency and a plurality of workflows; retrieve information regarding a dependency change history regarding at least one of the plurality of tasks; retrieve information regarding the particular version of the workflow and a different version of the workflow; identify a resolution for the conflict based, at least in part, upon the information retrieved from the global dependency data structure, the retrieved information regarding the dependency change history regarding at least one of the plurality of tasks, the information retrieved regarding the dependency and the plurality of workflows, and the information retrieved regarding the particular version of the workflow and the different version of the workflow; and perform a corrective action to resolve the conflict based, at least in part, upon the identified resolution.

The system can include wherein the conflict is automatically resolved by using the different version of the particular workflow. The system can further include wherein the conflict is automatically resolved by executing the particular workflow. The system can include wherein the conflict is automatically resolved by providing information regarding the conflict to a user via a graphical user interface.

The system can further include wherein the information provided to the user comprises is based, at least in part, upon the information retrieved from the global dependency data structure, and, the information retrieved regarding the dependency and the plurality of workflows. The system can further include wherein the global dependency data structure further stores current dependency information of at least one of the plurality of tasks. The system can further include wherein the conflict is further automatically resolved based upon whether or not a task is bound to the dependency.

The system can include the memory having further computer-executable instructions stored thereupon which, when executed by the processor, cause the computer to: receive a version of a particular task of the plurality of tasks; update dependency information stored in the global dependency data structure based, at upon in part upon the received version of the particular task; package a particular workflow comprising particular versions of at least some of the plurality of tasks; and store information mapping the particular workflow to the dependencies of the at least some of the plurality of tasks.

Described herein is a method of dependency version conflict auto-resolution, comprising: during execution of a particular version of a workflow comprising a plurality of tasks, receiving information regarding a particular task of the plurality of tasks to be executed, the particular task dependent on another task of the plurality of tasks; retrieving information regarding the dependency from a global dependency data structure, wherein the global dependency data structure stores current dependency information regarding the plurality of tasks; determining whether a conflict exists with respect to the dependency of the particular task on the another task; and when it is determined that the conflict exists: retrieving information regarding the dependency and a plurality of workflows; retrieving information regarding a dependency change history regarding at least one of the plurality of tasks; retrieving information regarding the particular version of the workflow and a different version of the workflow; identifying a resolution for the conflict based, at least in part, upon the information retrieved from the global dependency data structure, the retrieved information regarding the dependency change history regarding at least one of the plurality of tasks, the information retrieved regarding the dependency and the plurality of workflows, and the information retrieved regarding the particular version of the workflow and the different version of the workflow; and performing a corrective action to resolve the conflict based, at least in part, upon the identified resolution.

The method can further include wherein the conflict is automatically resolved by using the different version of the particular workflow. The method can further include wherein the conflict is automatically resolved by executing the particular workflow. The method can further include wherein the conflict is automatically resolved by providing information regarding the conflict to a user via a graphical user interface.

The method can further include wherein the information provided to the user comprises is based, at least in part, upon the information retrieved from the global dependency data structure, and, the information retrieved regarding the dependency and the plurality of workflows. The method can further include wherein the global dependency data structure further stores dependency information a future dependency of at least one of the plurality of tasks. The method can further include wherein the conflict is further automatically resolved based upon whether or not a task is bound to the dependency.

The method can further include: receiving a version of a particular task of the plurality of tasks; updating dependency information stored in the global dependency data structure based, at upon in part upon the received version of the particular task; packaging a particular workflow comprising particular versions of at least some of the plurality of tasks; and storing information mapping the particular workflow to the dependencies of the at least some of the plurality of tasks.

Described herein is a computer storage media storing computer-readable instructions that when executed cause a computing device to: during execution of a particular version of a workflow comprising a plurality of tasks, receive information regarding a particular task of the plurality of tasks to be executed, the particular task dependent on another task of the plurality of tasks; retrieve information regarding the dependency from a global dependency data structure, wherein the global dependency data structure stores current dependency information regarding the plurality of tasks; determine whether a conflict exists with respect to the dependency of the particular task on the another task; and when it is determined that the conflict exists: retrieve information regarding the dependency and a plurality of workflows; retrieve information regarding a dependency change history regarding at least one of the plurality of tasks; retrieve information regarding the particular version of the workflow and a different version of the workflow; identify a resolution for the conflict based, at least in part, upon the information retrieved from the global dependency data structure, the retrieved information regarding the dependency change history regarding at least one of the plurality of tasks, the information retrieved regarding the dependency and the plurality of workflows, and the information retrieved regarding the particular version of the workflow and the different version of the workflow; and perform a corrective action to resolve the conflict based, at least in part, upon the identified resolution.

The computer storage media can further include wherein the conflict is automatically resolved by using the different version of the particular workflow. The computer storage media can further include wherein the global dependency data structure further stores dependency information a future dependency of at least one of the plurality of tasks.

The computer storage media can store further computer-readable instructions that when executed cause a computing device to: receive a version of a particular task of the plurality of tasks; update dependency information stored in the global dependency data structure based, at upon in part upon the received version of the particular task; package a particular workflow comprising particular versions of at least some of the plurality of tasks; and store information mapping the particular workflow to the dependencies of the at least some of the plurality of tasks.

Figure 6:
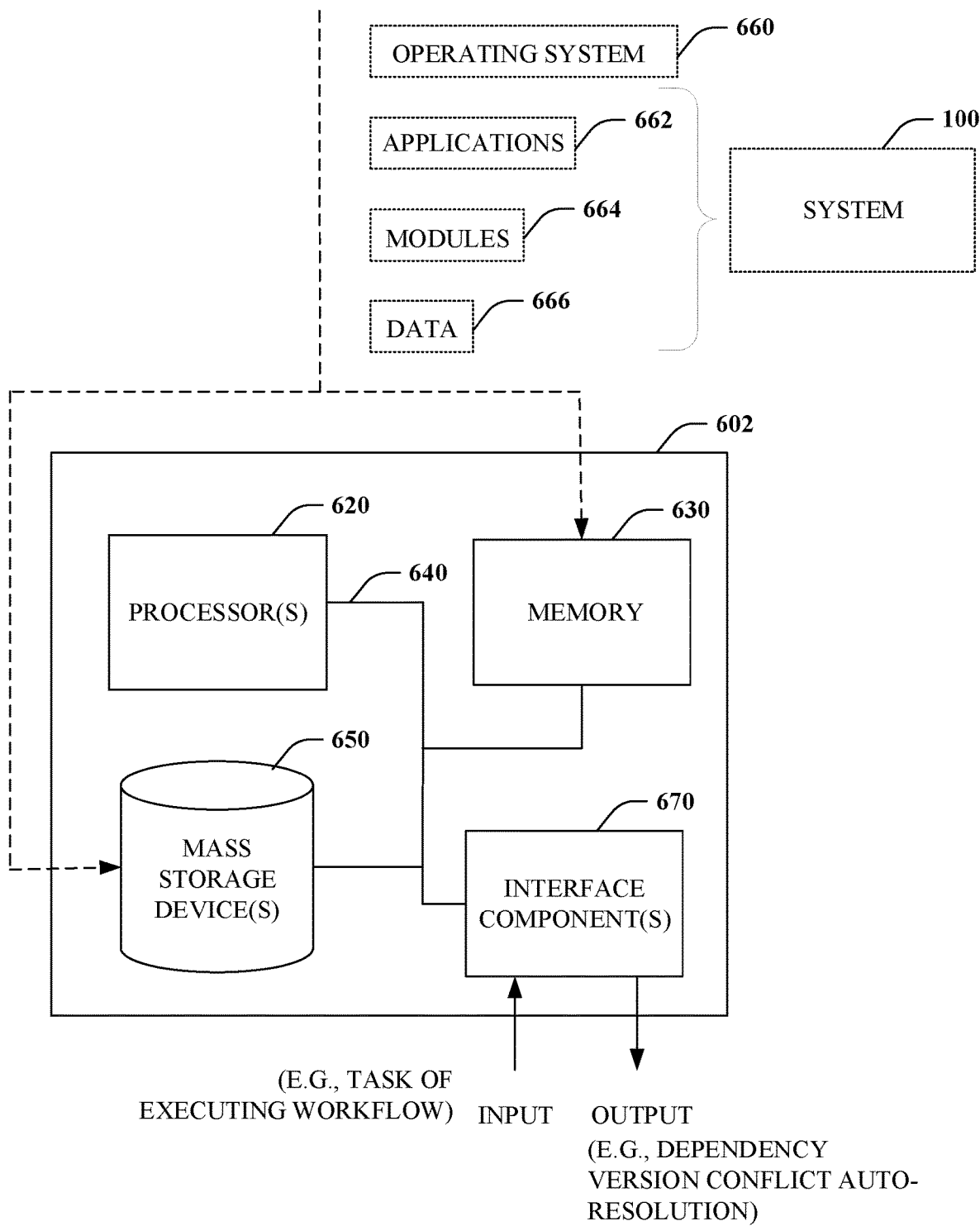
FIG. 6 is a functional block diagram that illustrates an exemplary computing system.

With reference to FIG. 6, illustrated is an example general-purpose computer or computing device 602 (e.g., mobile phone, desktop, laptop, tablet, watch, server, handheld, programmable consumer or industrial electronics, set-top box, game system, compute node, etc.). For instance, the computing device 602 may be used in a system for job execution 100.

The computer 602 includes one or more processor(s) 620, memory 630, system bus 640, mass storage device(s) 650, and one or more interface components 670. The system bus 640 communicatively couples at least the above system constituents. However, it is to be appreciated that in its simplest form the computer 602 can include one or more processors 620 coupled to memory 630 that execute various computer executable actions, instructions, and or components stored in memory 630. The instructions may be, for instance, instructions for implementing functionality described as being carried out by one or more components discussed above or instructions for implementing one or more of the methods described above.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 620 can be a graphics processor.

The computer 602 can include or otherwise interact with a variety of computer-readable media to facilitate control of the computer 602 to implement one or more aspects of the claimed subject matter. The computer-readable media can be any available media that can be accessed by the computer 602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 602. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 630 and mass storage device(s) 650 are examples of computer-readable storage media. Depending on the exact configuration and type of computing device, memory 630 may be volatile (e.g., RAM), non-volatile (e.g., ROM, flash memory, etc.) or some combination of the two. By way of example, the basic input/output system (BIOS), including basic routines to transfer information between elements within the computer 602, such as during start-up, can be stored in nonvolatile memory, while volatile memory can act as external cache memory to facilitate processing by the processor(s) 620, among other things.

Mass storage device(s) 650 includes removable/non-removable, volatile/non-volatile computer storage media for storage of large amounts of data relative to the memory 630. For example, mass storage device(s) 650 includes, but is not limited to, one or more devices such as a magnetic or optical disk drive, floppy disk drive, flash memory, solid-state drive, or memory stick.

Memory 630 and mass storage device(s) 650 can include, or have stored therein, operating system 660, one or more applications 662, one or more program modules 664, and data 666. The operating system 660 acts to control and allocate resources of the computer 602. Applications 662 include one or both of system and application software and can exploit management of resources by the operating system 660 through program modules 664 and data 666 stored in memory 630 and/or mass storage device (s) 650 to perform one or more actions. Accordingly, applications 662 can turn a general-purpose computer 602 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 662, and include one or more modules 664 and data 666 stored in memory and/or mass storage device(s) 650 whose functionality can be realized when executed by one or more processor(s) 620.

In some embodiments, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 602 also includes one or more interface components 670 that are communicatively coupled to the system bus 640 and facilitate interaction with the computer 602. By way of example, the interface component 670 can be a port (e.g., serial, parallel, PCMCIA, USB, FireWire, etc.) or an interface card (e.g., sound, video, etc.) or the like. In one example implementation, the interface component 670 can be embodied as a user input/output interface to enable a user to enter commands and information into the computer 602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 670 can be embodied as an output peripheral interface to supply output to displays (e.g., LCD, LED, plasma, etc.), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for job execution, comprising:

a computer comprising a processor and a memory having computer-executable instructions stored thereupon which, when executed by the processor, cause the computer to:

during execution of a particular version of a workflow comprising a plurality of tasks, receive information regarding a particular task of the plurality of tasks to be executed, the particular task having a dependency on another task of the plurality of tasks;

retrieve information regarding the dependency from a global dependency data structure, wherein the global dependency data structure stores current dependency information regarding the plurality of tasks;

determine whether a conflict exists with respect to the dependency of the particular task on the another task; and when it is determined that the conflict exists:
retrieve information regarding the dependency and a plurality of workflows;
retrieve information regarding a dependency change history regarding at least one of the plurality of tasks;
retrieve information regarding the particular version of the workflow and a different version of the workflow;
identify a resolution for the conflict based, at least in part, upon the information regarding the dependency retrieved from the global dependency data structure, the retrieved information regarding the dependency change history regarding the at least one of the plurality of tasks, the retrieved information regarding the dependency and the plurality of workflows, and the retrieved information regarding the particular version of the workflow and the different version of the workflow; and
perform a corrective action to resolve the conflict based, at least in part, upon the identified resolution.

2. The system of claim 1, wherein the conflict is automatically resolved by using the different version of the workflow.

3. The system of claim 1, wherein the conflict is automatically resolved by executing the workflow.

4. The system of claim 1, wherein the conflict is automatically resolved by providing information regarding the conflict to a user via a graphical user interface.

5. The system of claim 4, wherein the information provided to the user is based, at least in part, upon the information regarding the dependency retrieved from the global dependency data structure and the retrieved information regarding the dependency and the plurality of workflows.

6. The system of claim 1, wherein the conflict is further automatically resolved based upon whether or not a task is bound to the dependency.

7. The system of claim 1, the memory having further computer-executable instructions stored thereupon which, when executed by the processor, cause the computer to:

receive a version of the particular task of the plurality of tasks;
update the current dependency information stored in the global dependency data structure based at least in part upon the received version of the particular task;
package a particular workflow comprising particular versions of at least some of the plurality of tasks; and store information mapping the particular workflow to dependencies of the at least some of the plurality of tasks.

8. A method of dependency version conflict auto-resolution, comprising:

during execution of a particular version of a workflow comprising a plurality of tasks, receiving information regarding a particular task of the plurality of tasks to be executed, the particular task having a dependency on another task of the plurality of tasks;

retrieving information regarding the dependency from a global dependency data structure, wherein the global dependency data structure stores current dependency information regarding the plurality of tasks;

determining whether a conflict exists with respect to the dependency of the particular task on the another task; and when it is determined that the conflict exists:
retrieving information regarding the dependency and a plurality of workflows;
retrieving information regarding a dependency change history regarding at least one of the plurality of tasks;
retrieving information regarding the particular version of the workflow and a different version of the workflow;
identifying a resolution for the conflict based, at least in part, upon the information regarding the dependency retrieved from the global dependency data structure, the retrieved information regarding the dependency change history regarding the at least one of the plurality of tasks, the retrieved information regarding the dependency and the plurality of workflows, and the retrieved information regarding the particular version of the workflow and the different version of the workflow; and
performing a corrective action to resolve the conflict based, at least in part, upon the identified resolution.

9. The method of claim 8, wherein the conflict is automatically resolved by using the different version of the workflow.

10. The method of claim 8, wherein the conflict is automatically resolved by executing the workflow.

11. The method of claim 8, wherein the conflict is automatically resolved by providing information regarding the conflict to a user via a graphical user interface.

12. The method of claim 11, wherein the information provided to the user is based, at least in part, upon the information regarding the dependency retrieved from the global dependency data structure and the retrieved information regarding the dependency and the plurality of workflows.

13. The method of claim 8, wherein the global dependency data structure further stores future dependency information about a future dependency of one or more of the plurality of tasks.

14. The method of claim 8, wherein the conflict is further automatically resolved based upon whether or not a task is bound to the dependency.

15. The method of claim 8, further comprising:

receiving a version of the particular task of the plurality of tasks;
updating the current dependency information stored in the global dependency data structure based at least in part upon the received version of the particular task;
packaging a particular workflow comprising particular versions of at least some of the plurality of tasks; and storing information mapping the particular workflow to dependencies of the at least some of the plurality of tasks.

16. A computer storage media storing computer-readable instructions that, when executed, cause a computing device to:

during execution of a particular version of a workflow comprising a plurality of tasks, receive information regarding a particular task of the plurality of tasks to be executed, the particular task having a dependency on another task of the plurality of tasks;

retrieve information regarding the dependency from a global dependency data structure, wherein the global dependency data structure stores current dependency information regarding the plurality of tasks;

determine whether a conflict exists with respect to the dependency of the particular task on the another task; and when it is determined that the conflict exists:

retrieve information regarding the dependency and a plurality of workflows;

retrieve information regarding a dependency change history regarding at least one of the plurality of tasks;

retrieve information regarding the particular version of the workflow and a different version of the workflow;

identify a resolution for the conflict based, at least in part, upon the information regarding the dependency retrieved from the global dependency data structure, the retrieved information regarding the dependency change history regarding at least one of the plurality of tasks, the retrieved information regarding the dependency and the plurality of workflows, and the retrieved information regarding the particular version of the workflow and the different version of the workflow; and perform a corrective action to resolve the conflict based, at least in part, upon the identified resolution.

17. The computer storage media of claim 16, wherein the conflict is automatically resolved by using the different version of the workflow.

18. The computer storage media of claim 16, wherein the global dependency data structure further stores future dependency information about a future dependency of one or more of the plurality of tasks.

19. The computer storage media of claim 16 storing computer-readable instructions that, when executed, cause the computing device to:

receive a version of the particular task of the plurality of tasks;

update the current dependency information stored in the global dependency data structure based at least in part upon the received version of the particular task;

package a particular workflow comprising particular versions of at least some of the plurality of tasks; and store information mapping the particular workflow to dependencies of the at least some of the plurality of tasks.

* * * * *